May 24, 1966  R. A. SIMMONS  3,252,251

COVERING FOR A SEED OR PLANT BED

Filed Dec. 21, 1964

INVENTOR:
ROBERT A. SIMMONS

BY Garrott, Bell, Seltzer, Park + Heard

ATTORNEYS

United States Patent Office 3,252,251
Patented May 24, 1966

3,252,251
COVERING FOR A SEED OR PLANT BED
Robert A. Simmons, Trenton, N.J., assignor to The Kendall Company, Boston, Mass., a corporation of Massachusetts
Filed Dec. 21, 1964, Ser. No. 419,737
5 Claims. (Cl. 47—29)

The present invention relates to seed or plant beds for the germination of seeds and/or the initial growth of plants, and more particularly to a covering for such beds providing enhanced seed germination and plant growth.

It is well known to provide seed or plant beds for the germination of certain seeds and/or for the initial growth of certain plants and this is particularly true with those plants which are initially grown in such beds to a predetermined stage in the growth cycle thereof and are then transplanted into a larger bed or field for additional growth to full maturity. Examples of such plants are tomatoes, tobacco, sweet potatoes, certain flowering plants and certain shrubbery.

Such seed or plant beds usually must be fumigated before planting of seeds or plants therein and this is done by treating the soil with a fumigant or germicide, such as methyl bromide, for a predetermined period. A suitable gas-impervious covering, such as plastic, is normally used over the beds during fumigation to contain the fumigant in contact with the soil of the bed.

Also, it is usually desirable to obtain germination of the seeds and/or initial growth of the plants when seasonal atmospheric conditions are such that seed germination and/or plant growth are impractical, if not impossible, such as in late winter or early spring. For example, during this time of year, there is a fairly wide temperature range during a twenty-four (24) hour period, and there is an ever-present danger of frost, freezing temperatures, or other seasonal atmospheric conditions which would have adverse effects upon unprotected plants.

Accordingly, farmers or plant growers conventionally employ gas-impervious, transparent plastic coverings with which they cover the beds during fumigation thereof and also, after the seeds or the like have been planted. Such plastic coverings have the desirable characteristics of admitting sun-light into the bed and protecting the seeds and/or plants from the adverse effects of relatively low temperature atmospheric conditions, and thereby enhance seed germination and plant growth.

However, such plastic coverings have several disadvantages, foremost of which is the danger of scalding of the plants due to excessive heat build-up in the bed and the direct rays of the sun striking the plants during the mid-portion of the day. Also, plants have a tendency to grow too fast under such plastic coverings and to become spindly rather than strong and hardy.

In an attempt to overcome the disadvantages of such plastic coverings, many farmers remove the plastic coverings from the beds after the seeds have germinated and the danger of damage to the plants due to low temperatures has been reduced. These farmers then cover the beds with shade cloths of textile fabric which protect the plants from scalding from excessive heat and sunlight and to some degree from the adverse effects of low temperature atmospheric conditions. However, such fabric coverings do not afford sufficient protection against very low temperature atmospheric conditions which frequently occur after removal of the plastic coverings and placement of the fabric coverings. Damage to the plants therefore frequently occurs.

Also, plant growth under the fabric coverings is not as fast as under the plastic coverings which prevents the plants from becoming spindly, but also frequently results in the plants not growing fast enough to reach the desired predetermined stage in the plant growth cycle by the time transplanting is to be done.

It is therefore an object of the present invention to provide a novel covering for a seed or plant bed whereby the aforementioned deficiencies of conventional coverings and the aforementioned problems encountered in their use are obviated.

The present invention obviates these deficiencies of conventional coverings by providing a covering which comprises a pair of light-pervious plastic and textile fabric layers laminated together and providing the advantages of separate plastic and fabric coverings without the disadvantages discussed above. For example, there is substantially less likelihood of scalding of plants under the covering of the present invention and these plants do not grow so fast as to become spindly since the fabric layer shades the plants to a sufficient degree to prevent excessive build-up of heat and too much direct sunlight while still permitting sufficient sunlight to penetrate therethrough for good, healthy plant growth. Additionally, since the danger or likelihood of scalding is removed or at least substantially reduced, the plastic layer may remain on the bed for a longer period and the plants are therefore protected against the adverse effects of low temperature atmospheric conditions until all likelihood of such low temperature atmospheric conditions occurring has passed.

Preferably, the plastic layer is substantially imperforate and is also preferably resistant to the passage of fumigating gases therethrough such that the covering may be used for fumigation of the bed. Further, the plastic and fabric layers of the covering of the present invention are readily delaminatable to separate the same and preferably, this delamination is accomplished while the covering is on the bed so that the fabric layer may be retained in place thereon. The fabric layer may then be maintained on the bed to shade the plants and protect the same from too much direct sunlight until transplanting of the plants.

Therefore, a more specific object of the present invention is to provide a novel covering for a seed or plant bed wherein the bed may be initially covered by a composite covering providing the advantages of separate plastic and fabric coverings without the disadvantages thereof and thereafter the bed may be covered by a fabric covering until transplanting is desired.

Another object of the present invention is to provide a novel covering for a seed or plant bed whereby fumigation of the bed may be accomplished, seed germination and initial plant growth are enhanced, and more sturdy and healthier plants are achieved.

Some of the objects of the invention having been stated, other objects will appear as the description proceeds when taken in connection with the accompanying drawings, in which—

Figure 1:
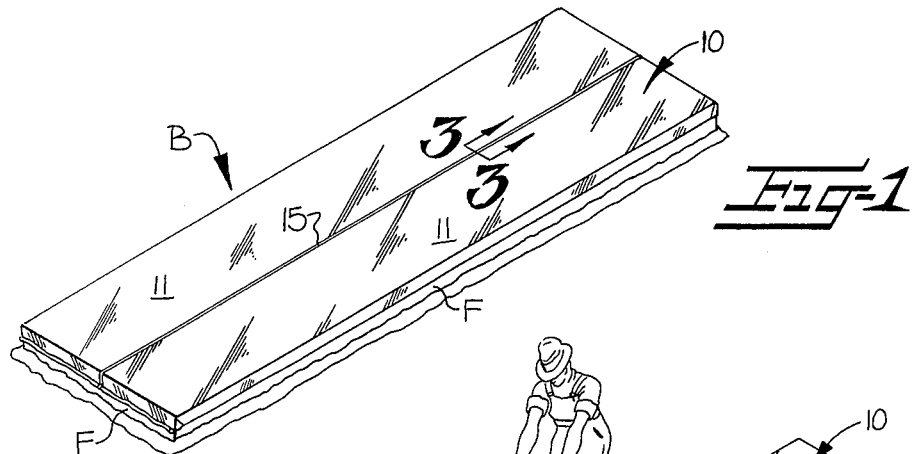
FIGURE 1 is an isometric view of a seed or plant bed with the covering of the present invention shown in position thereon.

Referring now to the drawings and more specifically to FIGURE 1, there is shown therein a seed or plant bed B which may be of any conventional character with or without a frame F bounding the same. A covering 10 embodying the features of the present invention is disposed over the frame F in covering relation to the seed or plant bed B.

Covering 10 is of lightweight, multi-layer construction and preferably comprises a pair of superposed, laminated layers 11 and 12. Layer 11 is of light-pervious plastic material, such as polyethylene, having a thickness within the range of about one-half (½) to three (3) mils. Plastic layer 11 is preferably substantially imperforate and is also preferably resistant to the passage of fumigating gases therethrough to permit covering 10 to be used in the fumigation of seed or plant beds B. However, if desired, plastic layer 11 may be provided with a predetermined number of perforations per inch to control the build-up of heat thereunder and to thereby obtain an intermediate rate of plant growth. In such a case, the rate of plant growth could be controlled by varying the number and/or size of the perforations.

Figure 4:
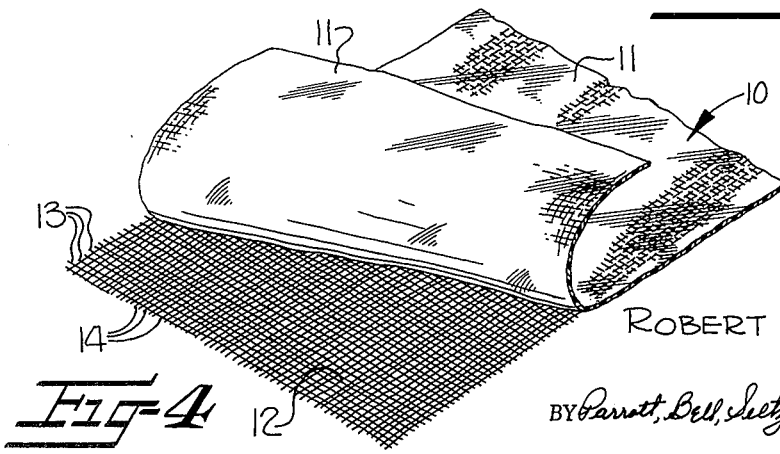
FIGURE 4 is a fragmentary enlarged perspective view of the area within the box 4 in FIGURE 2.

Layer 12 comprises a textile fabric of any suitable lightweight construction, but preferably formed of interwoven warp and filling yarns 13 and 14, respectively (FIGURE 4). Warp and filling yarns 13 and 14 are interwoven in such an open-weave construction as to impart light-pervious characteristics to fabric layer 12. In addition, fabric layer 12 preferably has a warp end count within the range of about 18 to 40 ends per inch and a filling pick count within the range of about 14 to 36 picks per inch.

Warp and filling yarns 13 and 14 may be of any desired yarn sizes, but are preferably of such sizes as to provide fabric layer 12 with a weight within the range of about 8 to 30 yards per pound. Plastic and fabric layers 11 and 12 therefore have a combined weight within the range of three-fourths (¾) to four (4) ounces per square yard.

Plastic layer 11 and fabric layer 12 are laminated together in any suitable manner, but with the degree of adherence controlled such that these layers are easily and readily delaminatable. For example, the platsic and fabric layers may be laminated by a hot melt process, wherein the plastic layer is formed directly onto the fabric layer, and the degree of adherence is controlled by controlling the temperature, etc., of the plastic. Other methods of lamination, such as heated calender rolls, adhesive, etc., may be used, but, in each instance, the degree of adherence should be controlled to provide ready delaminatability. Preferably, the plastic and fabric layers 11 and 12 should be delaminatable by a peeling force within the range of about 5 to 20 ounces per inch of width as determined by a Scott tester having two relatively movable jaws which respectively have the plastic and fabric layers clamped therein and then move apart a predetermined distance and wherein the resistance to this movement is recorded.

When a thermoplastic film is used and the lamination involves the use of heat and/or pressure, it is preferable to avoid imbedding the yarns of the fabric in the film, so that a peeling force within the desired range is obtained. However, it is also possible to control the peeling force by reducing the number and pattern of the points of adherence between the film and the fabric. For example, one of the calender rolls could be a patterned roll which would produce a predetermined pattern of spaced apart points of adherence between the film and the fabric, or a series of concentric discs in place of one calender roll could produce stripes of adherence between the film and the fabric. In any event, the peeling force required should not be so great that the film or fabric will tear when the film layer is removed.

Figure 2:
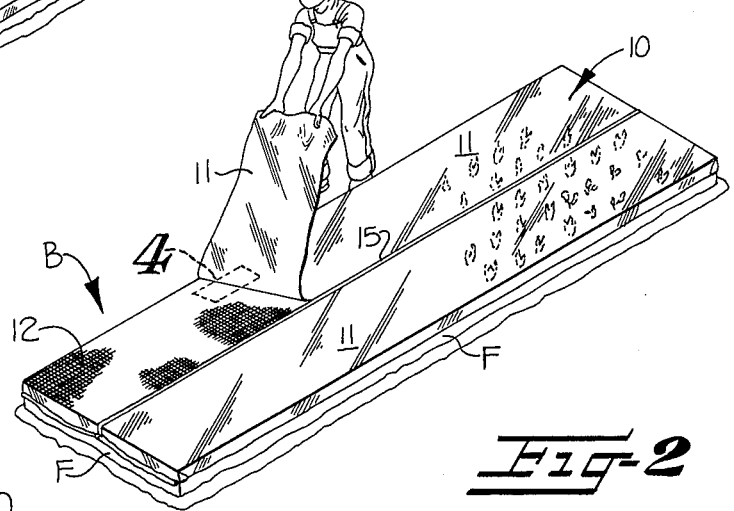
FIGURE 2 is a view similar to FIGURE 1 and illustrating the manner of delaminating the layers of the covering of the present invention.
Figure 3:
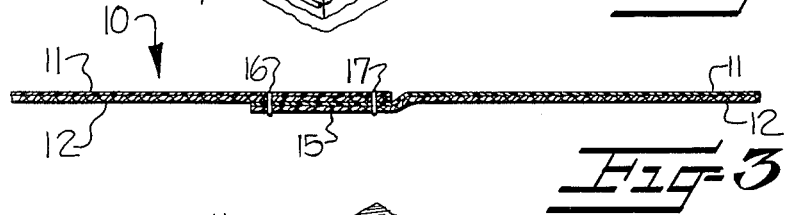
FIGURE 3 is an enlarged, transverse sectional view taken substantially along line 3—3 in FIGURE 1.

Due to the limitations on the width at which fabric layer 12 may be woven and since plastic layer 11 and fabric layer 12 are preferably coextensive in both width and length, it may be necessary that a plurality of sheets of laminated plastic and fabric layers 11 and 12 be secured together in side-by-side relation to provide a covering 10 of the required width to cover a bed B. Preferably, the adjacent side edge portions of these sheets to be secured together are overlapped and stitched to form a flat seam 15 (FIGURES 2 and 3). Seam 15 preferably includes two spaced apart lines of stitching 16 and 17 and it is noted that the lines of perforations formed in the plastic layers 11 by the needles forming these lines of stitching 16 and 17 define tear lines along which the plastic layers 11 may be readily torn to facilitate their removal from the fabric layers 12.

Covering 10 may be placed in covering relation to a seed or plant bed before fumigation, used during this process and then removed for seeding or plant of the bed. Covering 10 is then placed in covering relation to the bed after seeding or planting thereof, preferably with the plastic layer 11 uppermost. Covering 10 is then maintained on the bed for a first time or plant growth period during which the seeds germinate and/or the plants grow into strong, healthy young plants. This first time or growth period may be of sufficient length that all danger of adverse effects on the plants by low temperature atmospheric conditions has passed. This is possible since there is little or no likelihood or danger of either scalding of the plants or of the plants growing so fast as to become spindly during use of covering 10 due to the diffusion of sunlight and shading effect of the fabric layer 12 beneath plastic layer 11. Therefore, contrary to conventional plastic coverings, there is no reason for premature removal of the plastic layer 11 from the fabric layer 12.

After this first time or growth period, plastic layer 11 is delaminated from fabric layer 12 by being peeled therefrom which is readily accomplished by the average plant grower due to the controlled degree of adherence discussed above. Preferably, this delamination is accomplished while the fabric layer 12 is being maintained on the bed (as illustrated in FIGURE 2).

After this delamination, fabric layer 12 is maintained in covering relation to the bed for an additional time or growth period which may continue until transplanting of the plants is to be done. During this period, the fabric layer 12 shades the plants to some degree while permitting substantially free circulation of air into the bed which enhances the growth of strong, healthy plants.

It will therefore be apparent that the present invention provides a novel covering for a seed or plant bed and method of utilizing the same wherein plant growth is enhanced and the plants are protected from adverse effects of seasonal atmospheric conditions.

In the drawings and specification there has been set forth a preferred embodiment of the invention and, although specific terms are employed, they are used in a generic and descriptive sense only and not for purposes of limitation, the scope of the invention being defined in the claims.

I claim:

1. A lightweight, laminated multi-layer covering adapted to be used with a seed or plant bed and characterized by the layers thereof being readily delaminatable for providing a covering selectively usable as a composite covering and as a single layer covering for protecting the bed from adverse effects of various seasonal atmospheric conditions, said covering comprising a pair of light-pervious plastic and textile fabric layers laminated together and having a combined weight within the range of three-fourths (¾) to four (4) ounces per square yard, said plastic and fabric layers being delaminatable by a force within the range of about five (5) to twenty (20) ounces per inch of width, said covering being adapted to be placed in covering relation to a seed or plant bed for a first time period, the plastic layer thereafter being adapted to be delaminated from the fabric layer by being peeled therefrom, and the fabric layer then being adapted to be maintained in covering relation to the seed or plant bed for an additional time period.

2. A light-pervious, lightweight, laminated but readily delaminatable plastic and textile fabric covering adapted to be used with a seed or plant bed to protect the bed from adverse effects of seasonal atmospheric conditions and characterized by being initially usable as a composite plastic and fabric covering and after being delaminated being usable as a fabric covering, said covering comprising a pair of light-transmitting plastic and textile fabric layers laminated together and having a combined weight within the range of three-fourths (¾) to four (4) ounces per square yard, said plastic layer having a thickness within the range of about one-half (½) to three (3) mils, said fabric layer being formed of interwoven warp and filling yarns with a warp end count within the range of about 18 to 40 ends per inch and a filling pick count within the range of about 14 to 36 picks per inch, said plastic and fabric layers being delaminatable by a force within the range of about five (5) to twenty (20) ounces per inch of width, said covering being adapted to be placed in covering relation to a seed or plant bed for a first time period, the plastic layer thereafter being adapted to be delaminated from the fabric layer by being peeled therefrom, and the fabric layer then being adapted to be maintained in covering relation to the seed or plant bed for an additional time period.

3. A covering according to claim 2 wherein said plastic layer is substantially imperforate, and said plastic and fabric layers are coextensive.

4. A light-pervious, lightweight, laminated but readily delaminatable plastic and textile fabric covering adapted to be used with a seed or plant bed to protect the bed from adverse effects of seasonal atmospheric conditions and characterized by being initially usable as a composite plastic and fabric covering and after being delaminated being usable as a fabric covering, said covering comprising at least two elongate side-by-side portions having the adjacent side edges thereof overlapped and seamed together by at least one longitudinally extending line of stitching, each of said covering portions comprising a pair of coextensive light-pervious plastic and textile fabric layers laminated together and having a combined weight within the range of three-fourths (¾) to four (4) ounces per square yard, said plastic layer being substantially imperforate and resistant to the passage of fumigating gases therethrough and having a thickness within the range of about one-half (½) to three (3) mils, said fabric layer being formed of interwoven warp and filling yarns with a warp end count within the range of about 18 to 40 ends per inch and a filling pick count within the range of about 14 to 36 picks per inch, said plastic and fabric layers being delaminatable by a force within the range of about five (5) to twenty (20) ounces per inch of width with said line of stitching defining a tear line along which said plastic layers are tearable to aid in delamination thereof from said fabric layers without disconnecting said fabric layers, said covering being adapted to be placed in covering relation to a seed or plant bed for a first time period, the plastic layers thereafter being adapted to be delaminated from the fabric layers by being peeled therefrom, and the fabric layers then being adapted to be maintained in covering relation to the seed or plant bed for an additional time period.

5. A seed or plant bed protecting device for protecting the bed from adverse effects of seasonal atmospheric conditions, said protecting device comprising a frame adapted to define the perimeter of the seed or plant bed, and a covering for said frame comprising a pair of light-pervious, laminated but delaminatable plastic and textile fabric layers disposed over and secured to said frame in covering relation to the area bonded thereby, said plastic and fabric layers having a combined weight within the range of three-fourths (¾) to four (4) ounces per square yard and being delaminatable by a force within the range of about 5 to 20 ounces per inch of width thereof, said protecting device being adapted to be used to protect the seed or plant bed for a first time period with the plastic and fabric layers laminated together, the plastic layer then being adapted to be delaminated from the fabric layer by being peeled therefrom, and the fabric layer thereafter being adapted to be maintained over the frame in covering relation to the seed or plant bed for an additional time period.

References Cited by the Examiner

UNITED STATES PATENTS

| | | | |
|---|---|---|---|
| 1,584,632 | 5/1926 | Merwarth et al. | 47—31 |
| 2,070,596 | 2/1937 | Hansen. | |
| 2,132,568 | 10/1938 | Jacobs | 47—31 |
| 2,226,812 | 12/1940 | Goldberg | 47—28 |
| 2,281,635 | 5/1942 | Strauss | 161—89 |
| 2,401,997 | 6/1946 | Whitman | 47—31 |
| 2,709,293 | 5/1955 | Schwaderer | 161—148 X |
| 2,714,571 | 8/1955 | Irion. | |
| 2,753,662 | 7/1956 | Behnke | 47—29 |
| 2,974,442 | 3/1961 | Womelsdorf | 47—26 |
| 3,072,512 | 1/1963 | Dalle | 161—89 |

FOREIGN PATENTS 386,280    1/1933    Great Britain.

OTHER REFERENCES

German application 1,039,295, September 1958, 47—26.

ABRAHAM G. STONE, *Primary Examiner.*

ALEXANDER WYMAN, F. B. HENRY,
*Assistant Examiners.*